United States Patent [19]

Wyslotsky

[11] 4,400,230
[45] Aug. 23, 1983

[54] LABEL INDEXING AND APPLICATOR APPARATUS

[75] Inventor: Ihor Wyslotsky, Alsip, Ill.

[73] Assignee: Labless, Israel, Rosh Pina, Israel

[21] Appl. No.: 323,994

[22] Filed: Nov. 23, 1981

[51] Int. Cl.³ .............................................. B65B 41/18
[52] U.S. Cl. ....................................... 156/361; 53/51;
  156/324; 156/495; 156/555; 226/27
[58] Field of Search ................................. 156/549–552,
  156/555, 495, 229, 361, 350, 324, 543; 226/4,
  45, 27–30; 53/51

[56] References Cited

U.S. PATENT DOCUMENTS

| 2,375,451 | 5/1945 | Waters | 156/361 X |
| 3,532,584 | 10/1970 | Evans | 156/549 |
| 3,762,125 | 10/1973 | Prena | 156/495 X |
| 3,767,510 | 10/1973 | Gustafson | 156/549 X |
| 3,816,210 | 6/1974 | Aoko et al. | 156/361 X |

Primary Examiner—David A. Simmons
Attorney, Agent, or Firm—Robert M. Ward

[57] ABSTRACT

The label indexing and applicator apparatus of the present invention includes laminating means for bonding labels in a controlled index from a rolled strip of flexible and stretchable label stock to a surface of a substrate to form a laminate. The apparatus includes means for unrolling the strip label stock at a tension less than the tension sufficient to impart any substantial longitudinal stretch thereto. Electric motor brake means are connected to and drive one of the nip rollers to grippingly drive the strip label stock therethrough at a controlled linear speed which is less than the pulling speed thereby to effect tension sufficient to impart a longitudinal stretch of controlled magnitude on the strip label stock. Control means are connected to the sensor means and the electric motor brake for receiving detection signals and for controlling and varying the drive speed of the electric motor brake. Accordingly, the rotational speed of the binding nip rollers is varied to impart a differential stretch to the strip label stock in order to present the selected portion of each successive pre-bonded distinct label for detection at a selected time.

33 Claims, 11 Drawing Figures

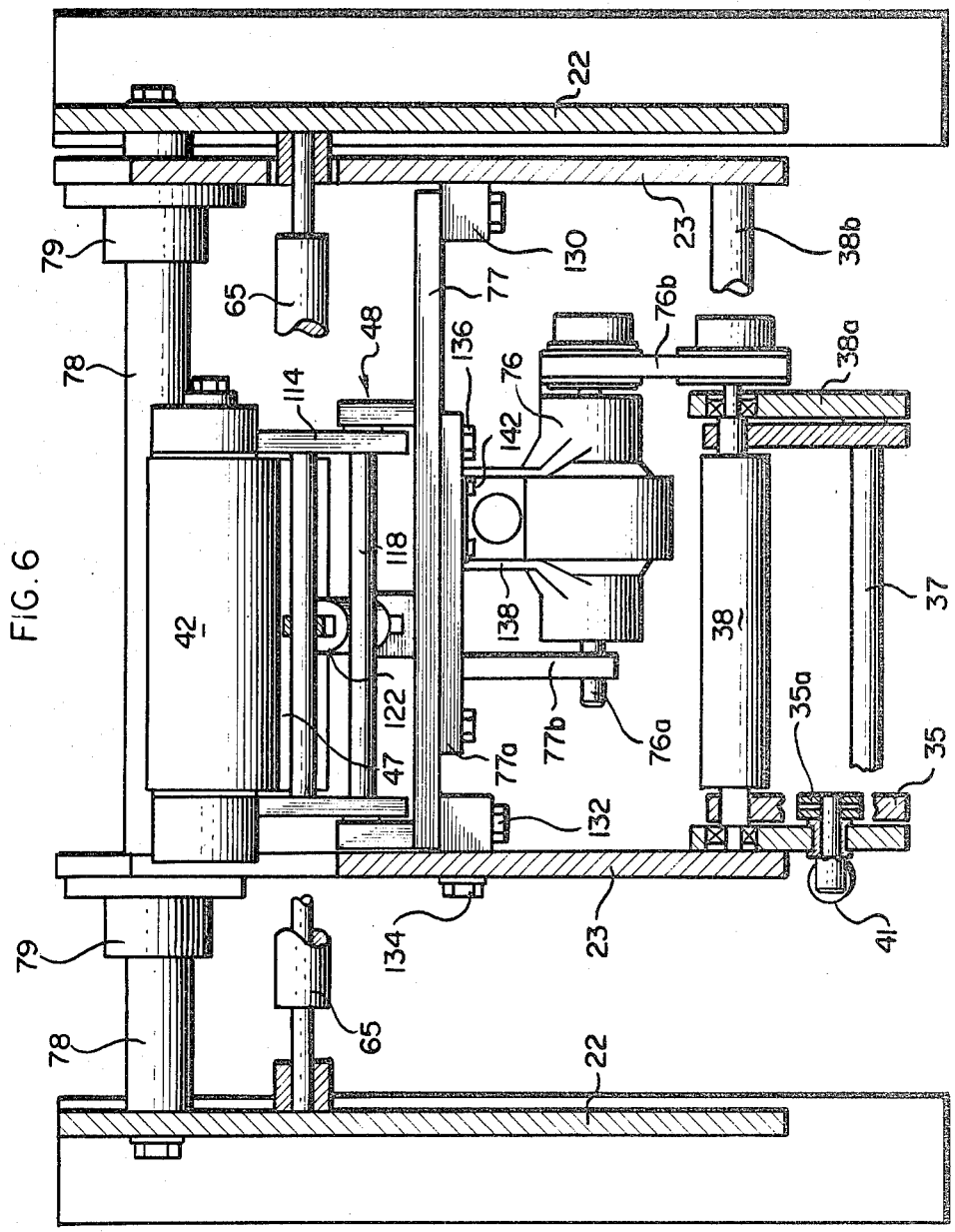

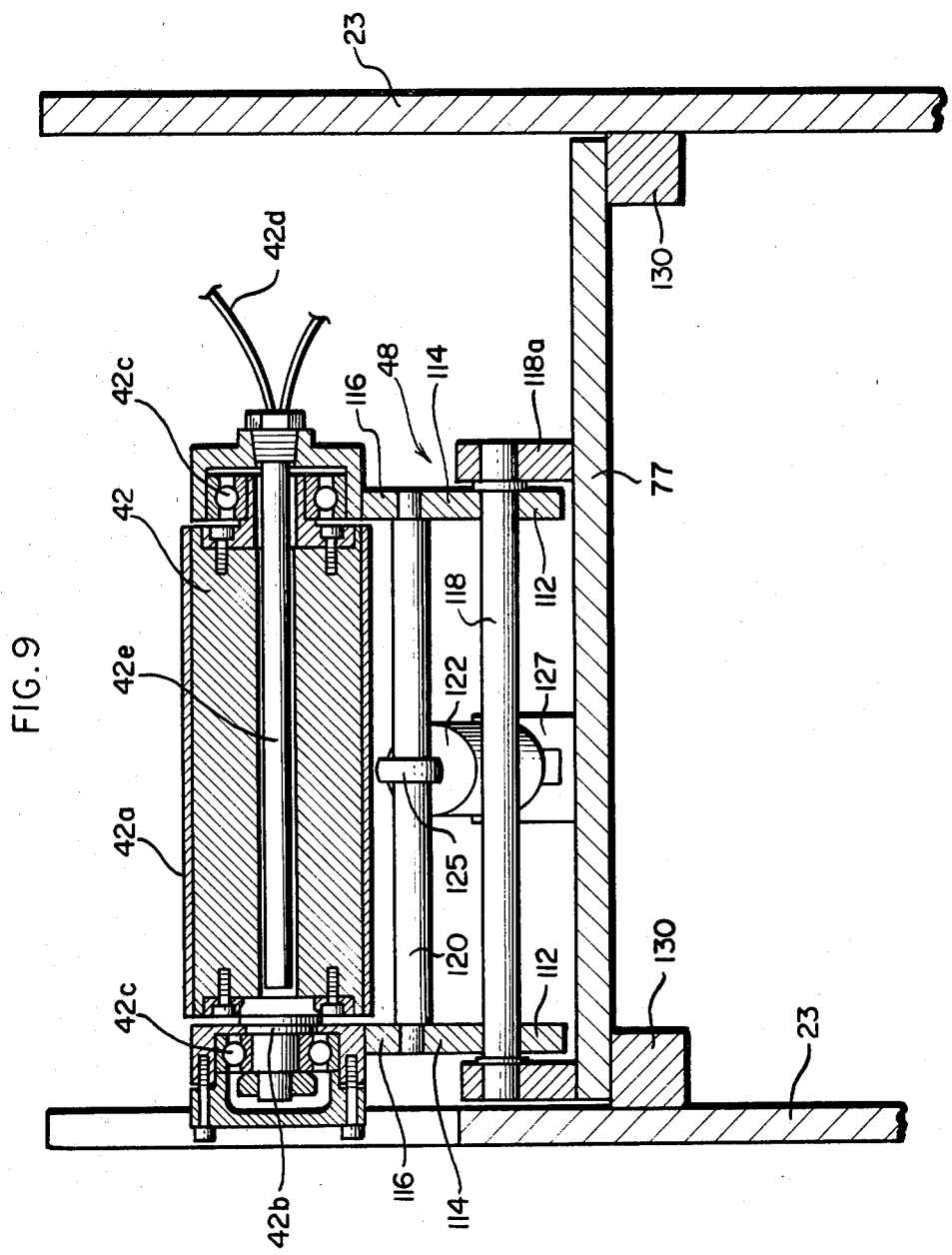

LABEL INDEXING AND APPLICATOR APPARATUS

BACKGROUND OF THE INVENTION

The present invention relates generally to labeling devices, and more specifically to a label indexing and applicator apparatus for continuous operation which will properly index the distinct labels onto a substrate stock by imparting a differential tension to the strip label stock.

The prior art discloses a wide variety of web registration mechanisms, many of which have been inefficient in their operation, and unduly complicated in their structure. These deficiencies have caused greater costs in the development and production of such devices and have lead to greater downtime and maintenance costs. In other prior art apparatuses, flexibility has been limited, which has permitted the utilization of only a limited variety of label forming materials, and which have been suitable for only a limited variety of packaging and other labeling applications.

It is the primary object of the present invention to overcome these deficiencies of prior art devices by providing an improved label indexing and applicator apparatus as disclosed and claimed hereinbelow.

SUMMARY OF THE INVENTION

The label indexing and applicator apparatus of the present invention is an apparatus comprising elements which function to form a laminate of a label material bearing selected visual indicia and a substrate backing material, which materials may be optimally selected for characteristics favorable to their respective functioning. In the label indexing and applicator apparatus of the present invention a wide strip of flexible and stretchable label stock material having labels longitudinally separated thereon by transparent or other detectable divider portions is provided for bonding to the surface of a substrate stock.

Strip label storage stock means are provided for carrying a roll of the strip label stock for unrolling in a first direction longitudinally of the apparatus frame. Label strip stock straightening means are next provided for maintaining the tension on the strip label stock to dispose it in an essentially unwrinkled state. Grip nip roller means are provided for engaging and gripping the strip label stock threadably disposed therethrough to exert a transverse grip thereon and to permit the strip label stock to pass therethrough upon the turning of the nip grip rollers.

Sensor means are disposed upstream of the grip nip means and opposite thereof for detecting the presence of the transparent or otherwise detectable label divider portions or indicia separating the distinct labels on the strip label stock. Heat nip means are provided for threadably engaging the strip label stock and the substrate stock therethrough, with cooling means disposed downstream thereof to cool the bonded laminate. Stock pulling means are disposed downstream of the cooling means for exerting a pulling force on the bonded strip label stock and substrate laminate for separately pulling the component stocks in an upstream direction through the label applicator apparatus at a selected speed.

Electric motor brake means are operatively connected to the nip roller means for turning the nip roller at a controlled variable linear speed to effect a differential stretch on the strip label stock corresponding to the speed of rotation of the nip roller means. Control means are connected to the sensor means and to the electric motor brake means to control and vary the speed of the electric motor brake means in accordance with the presence and location at a selected time of the transparent label divider portions separating the labels on the strip label stock to differentially stretch the strip label stock to effect registration of the bonded labels on the substrate stock.

The label indexing and applicator apparatus of the present invention, and preferred and alternative embodiments thereof, may be more completely understood with reference to the following drawing and detailed description of exemplary embodiments.

BRIEF DESCRIPTION OF THE DRAWING

Certain exemplary embodiments of the label indexing and applicator apparatus of the present invention are illustrated in the following drawing, in which:

FIG. 6 is an enlarged vertical transverse cross-sectional view taken along line 6—6 of FIG. 1, showing the details of the heat nip rollers and heat nip engagement means, and also the electric motor brake means for driving the nip grip driven roller;

FIG. 9 is a greatly enlarged horizontal transverse cross-sectional view taken along line 9—9 of FIG. 1, showing a cross-sectional view through the heated roller and the heat nip engagement means driven by the pneumatic cylinder as shown in FIGS. 7 and 8;

DETAILED DESCRIPTION OF PREFERRED EMBODIMENTS

Figure 1:
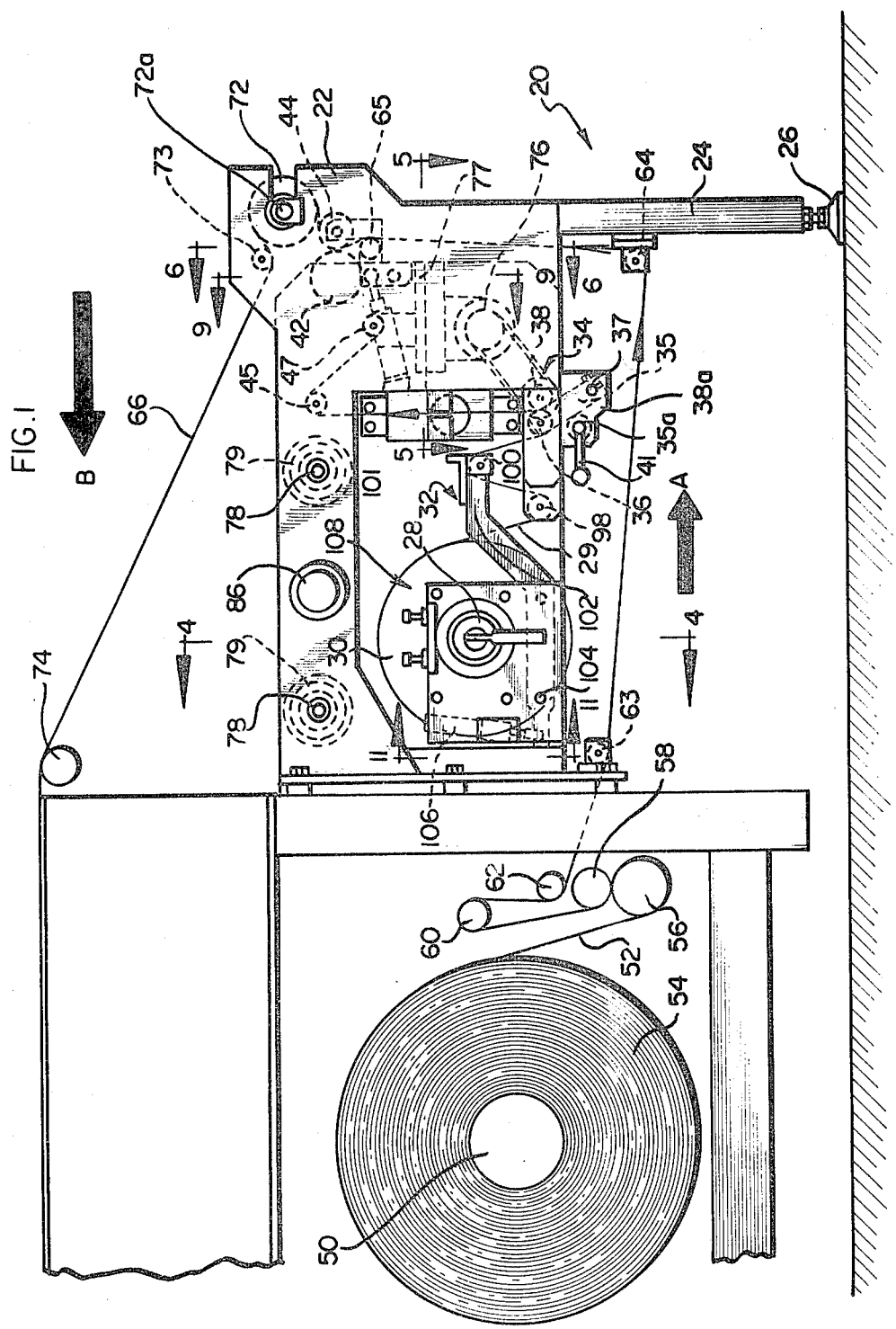
FIG. 1 is a partially cut away side view of one preferred embodiment of the label indexing and applicator apparatus of the present invention, showing the frame, substrate stock, strip label stock, grip nip means, electric motor brake means, sensor means, heat nip means and cooling means, inter alia.

The label indexing and applicator apparatus of the present invention is useful for bonding labels in controlled index from a rolled strip of flexible and stretchable label stock continuously onto a substrate stock. The labels in preferred embodiments are longitudinally separated on the strip by transparent label divider portions or by other detectable indicia separating said labels on the strip label stock into discrete label units.

The label indexing and applicator apparatus of the present invention first includes a frame from which the other elements thereof are operatively and adjustably supported. The frame may preferably include internal and external portions for carrying the various respective functional elements as set forth herein. A strip label stock storage shaft is carried by the frame for rotationally supporting a roll of the flexible and stretchable strip label stock. The strip label stock storage shaft has a substantially horizontal axis and is rotationally operative for unrolling the labels tangentially of the roll and upstream in the apparatus in a first direction for travelling longitudinally of the frame. Strip label stock straightening means are also carried by the frame and are disposed upstream of the strip label stock shaft storage means for applying and maintaining a tension on the strip label stock. The tension supplied is sufficient to maintain the strip label in an essentially unwrinkled state, but in preferred embodiments is insufficient to impart any substantial stretch to the strip label stock material.

A nip roller means comprising first and second grip nip rollers is carried by the frame and disposed upstream of the label strip straightening means to define a gripping nip through which the strip label stock is threadably disposed. The strip label stock is engaged by the grip nip rollers to exert a transverse grip by means of the nip on the strip label stock sufficient to bind and firmly hold the strip label stock therein, such that the strip label stock may pass therethrough only upon turning of the grip nip rollers.

Sensor means are also carried by the frame and are disposed upstream of the grip nip and opposite thereof for detecting the presence and location at a selected time of the transparent label divider portions separating the labels on the strip label stock. First and second heat nip rollers are carried by the frame and are disposed upstream of the sensor means. At least one of the first and second heat nip rollers is heated to define a heat nip therebetween for threadably engaging the strip label stock therethrough. Heat nip engagement means are carried by the frame for engaging the heat nip rollers into an operative configuration.

Substrate stock storage shaft means are provided for rotationally supporting and paying out the substrate stock from a roll thereof. In connection therewith, substrate stock directional roller means are carried by the frame for directing the substrate stock for disposition within and threadable engagement by the heat nip and in contact in the heat nip with the strip label stock. Accordingly, the strip label stock and the substrate are bonded together in the heat nip to form a laminate. Upstream of the heat nip is provided a cooling means for cooling the bonded strip label stock and substrate laminate.

Stock pulling means are disposed downstream of the cooling means for exerting a pulling force on the bonded strip label stock and substrate laminate. The stock pulling means functions to pull the strip label stock and substrate stock in an upstream direction through the label applicator apparatus at a selected speed.

An electric motor brake is carried by the frame and is connected to one of the grip nip rollers for turning the same to permit the gripped strip label stock to pass therethrough at a controlled variable linear speed. The result is to effect a differential stretch on the strip label stock corresponding to the speed of rotation of the nip roller.

Control means are connected to the sensor means and the electric motor brake means for controlling and varying speed of the electric motor brake in accordance with the presence and location at a selected time of the transparent label divided portions or other indicia separating the distinct labels on the strip label stock. The operative result is to differentially stretch the strip label stock to effect registration of the bonded labels on the substrate stock.

In preferred embodiments of the indexing and applicator apparatus of the present invention a label applicator apparatus interior frame is adjustably disposed within the exterior frame for lateral adjustment with respect to the exterior frame and for directly supporting at least the strip label stock storage shaft. In such preferred embodiments way bars may be provided for connecting to and extending horizontally across the interior frame, with the interior frame containing spaced apertures therein for receiving the way bars, thereby to be horizontally adjustable by sliding laterally on the way bars. In such preferred embodiments the spaced apertures may preferably be lined with a low friction material, such as TEFLON. Also in such preferred embodiments further included may preferably be adjustment rods secured at the distal end thereof to the interior frame. The adjustment rods preferably extend through an aperture in the exterior frame for adjustably securing the lateral disposition of the interior frame within the exterior frame. Such adjustment rod means may preferably comprise a threaded proximal end and may preferably include an engaging adjustment knob which when turned laterally moves the adjustment rod and thereby the attached interior frame to adjust the disposition of the interior frame within the exterior frame.

In further preferred embodiments the strip label stock shaft means may include thereon strip label roll securement means. The strip label roll securement means preferably comprises a first horizontally disposed roll bearing shaft carried by the interior frame, which roll bearing shaft has eccentric connection means at the free end thereof. A second horizontally disposed roll bearing shaft is provided and has mating eccentric means at one end thereof for rotational connection to the eccentric connection means of the first roll bearing shaft. The second roll bearing shaft has projecting roll engaging means thereon for engagement with the interior of the roll strip label stock. Accordingly, the second roll bearing shaft may then be rotated on the eccentric with respect to the first roll bearing shaft to engage the projecting roll engaging means with the interior of the roll of the strip label stock.

The label strip stock straightening means of the label indexing and applicator apparatus of the present invention preferably includes a first straightening roller having the shaft thereof fixably secured to render the first straightening roller stationary with respect to the interior frame. A second stationary roller is disposed in adjustable vertical configuration with respect to the first straightening roller. Thus, the strip label stock unwinding from the roll of strip label stock is disposed under the first straightening roller and over the second straightening roller to be tensioned and straightened by the relative vertical movement of the straightening rollers.

In such preferred embodiments a dancer lever means is further included which bears at the distal end thereof the second straightening roller. A fulcrum means is disposed on the dancer lever means and a piston means is engageably disposed with respect to the proximal end of the dancer lever means for pivoting the dancer lever means about the fulcrum means between inoperative and operative positions. The result is to effect relative separating movement upon extension of the piston means between said first and second rollers to provide thereby tension on the strip label stock extending between the rollers when in the operative position.

In such preferred embodiments dampening means are further provided for engaging the dancer lever means between the fulcrum means and the second straightening roller for dampening the upward movement of the dancer lever means upon operation of the piston means during tensioning of the strip label stock when in the operative position. In such preferred embodiments the dampening means comprises at least one coil spring disposed to engage the upper surface of the dancer lever means when in the operative position.

In preferred embodiments of the label and indexing applicator apparatus of the present invention one of the nip rollers is driven and the other nip roller is free to turn in response to the engagement between the nip rollers. In such embodiments, one of the nip rollers may be carried by a nip engagement lever for pivoting between an engaged position and a disengaged position for the ease of threading the strip label stock therebetween. In such embodiments the nip engagement lever is preferably pivotably supported at the proximal end thereof and one of the nip rollers is disposed at the distal end thereof. In such embodiments eccentric means may further be included for engaging the nip engagement lever between the proximal and distal ends thereof to move the nip engagement lever between the engaged and disengaged positions of the rotation thereof.

In preferred embodiments the sensor means may be preferably disposed substantially vertically of the nip rollers. The sensor means preferably comprises a photoelectric cell.

In addition to the rollers of the label and indexing applicator apparatus of the present invention as described hereinabove, a direction change roller is preferably disposed above the sensor means for changing the direction of the strip label stock from vertical movement to movement having a forward component upstream in the first direction. In such preferred embodiments a guide roller is also preferably disposed between the direction change roller and the heat nip. The heat nip rollers may preferably have a TEFLON surface for freedom from sticking of either of the strip label stock or the substrate stock. Such heat nip rollers are preferably mounted on respective roll shafts.

The heat nip engagement means preferably comprises respective laterally disposed elongate brackets having upwardly extending bracket ears upon which one of the heat nip roller shafts is transversely journaled at upper portions of the respective bracket ears. In such preferred embodiments a rocker shaft is further included, which rocker shaft has journaled thereon the bracket ears at a lower portion of the rocker shaft for rocking the brackets and thus rocking the heat nip roller thereon. Also such preferred embodiments may further include a fixed rod disposed between the upper portion and the lower portion of the respective bracket ears and connecting the respective bracket ears. Further included in these embodiments is a fluidic cylinder having its rod end attached to the fixed rod and the opposite end of the cylinder fixed to pivot one of the heat nip rollers into engagement with the other heat nip roller. In such preferred embodiments the fluidic cylinder rod engages the fixed rod at a cylinder portion thereof which is substantially equidistant of the respective bracket ears.

In other preferred embodiments of the label and indexing applicator apparatus of the present invention the substrate stock storage shaft means and the supported roll of substrate stock are disposed adjacent the strip label stock and on the side thereof opposite the grip nip, whereby the substrate stock may be paid out upstream and in the first direction previously defined hereinabove.

Guide rollers may be supplied for the substrate stock including at least one direction change guide roller disposed generally below the heat nip to change the direction of travel of the substrate stock from the first direction to a vertical direction for directing the substrate stock into the heat nip where laminating bonding occurs with the strip label stock.

The preferred cooling means preferably comprises a cooling roller disposed adjacent to the heat nip for cooling the bonded strip label and substrate stock laminate. The label and indexing applicator apparatus of the present invention preferably also includes at least one direction change roller disposed adjacent the cooling means for changing the direction of the bonded strip label and substrate stock laminate to a second direction substantially opposite to the first direction defined hereinabove for feeding into a packaging machine for example.

The stock pulling means preferably pulls each of the strip label stock and substrate stock from their respective rolls through the label applicator apparatus at a speed which coincides with the speed of an associated or other packaging machine.

In further alternative embodiments of the label indexing and applicator apparatus of the present invention laminating means are included for bonding labels in a controlled index from a rolled strip of flexible and stretchable label stock as defined hereinabove to unroll the strip label stock in an essentially unwrinkled state and at a tension at the upstream end less than the tension sufficient to impart any substantial stretch thereto. In such embodiments the nip roller separating the upstream and downstream ends of the apparatus drivingly engage the strip label stock therebetween and exert a selected binding force laterally thereon. This binding force is greater than the force sufficient to longitudinally stretch the strip label stock.

The electric motor brake that is provided is connected to and drives in preferred embodiments one of nip rollers at a controlled and variable rotational speed to grippingly drive the strip label stock therethrough at a controlled linear speed which is less than the pulling linear speed to effect tension sufficient to impart a longitudinal stretch of controlled magnitude on the strip label stock.

Pre-bonding sensor means are disposed on the downstream side of the nip rollers for generating a pre-bonding detection signal in response to a selected portion of each successive distinct label.

Post-bonding sensor means are disposed downstream of the laminating means for generating a post-bonding detection signal in response to a selected portion of each of the laminated distinct labels. Control means connect the pre-bonding and post-bonding sensor means and the electric motor brake means for receiving the respective detection signals and for controlling and varying the drive speed of the electric motor brake. Thereby, the rotational speed of the binding nip rollers varies the speed of the electric motor brake. Thereby, the rotational speed of the binding nip rollers varies the magnitude of the differential stretch imparted to the strip label stock to present the selected portion of each successive pre-bonded distinct label for detection at selected time.

Referring now to the drawing and to FIG. 1 in particular, the label indexing and applicator generally 20 of the present invention includes a frame 22. Frame 22 preferably supported by legs 24 having height adjusting means 26 carries the various respective functional elements as set forth herein. A strip label stock storage shaft 28 is carried by frame 22 for rotationally supporting a roll 30 of the flexible and stretchable strip label stock 29. Strip label stock storage shaft 28 has a substantially horizontal axis and is rotationally operative for unrolling the labels of strip label stock 29 tangentially of roll 30 and upstream in apparatus 20 in a first direction designated by Arrow A for travelling longitudinally of frame 22. Strip label stock straightening means generally 32 are also carried by frame 22 and is disposed upstream of strip label stock shaft 28 for applying and maintaining a tension on the strip label stock 29 being unwound from roll 30. The tension supplied is sufficient to maintain the strip label stock 29 in an essentially unwrinkled state, but in preferred embodiments is insufficient to impart any substantial stretch to the material of strip label stock 29.

Figure 5:
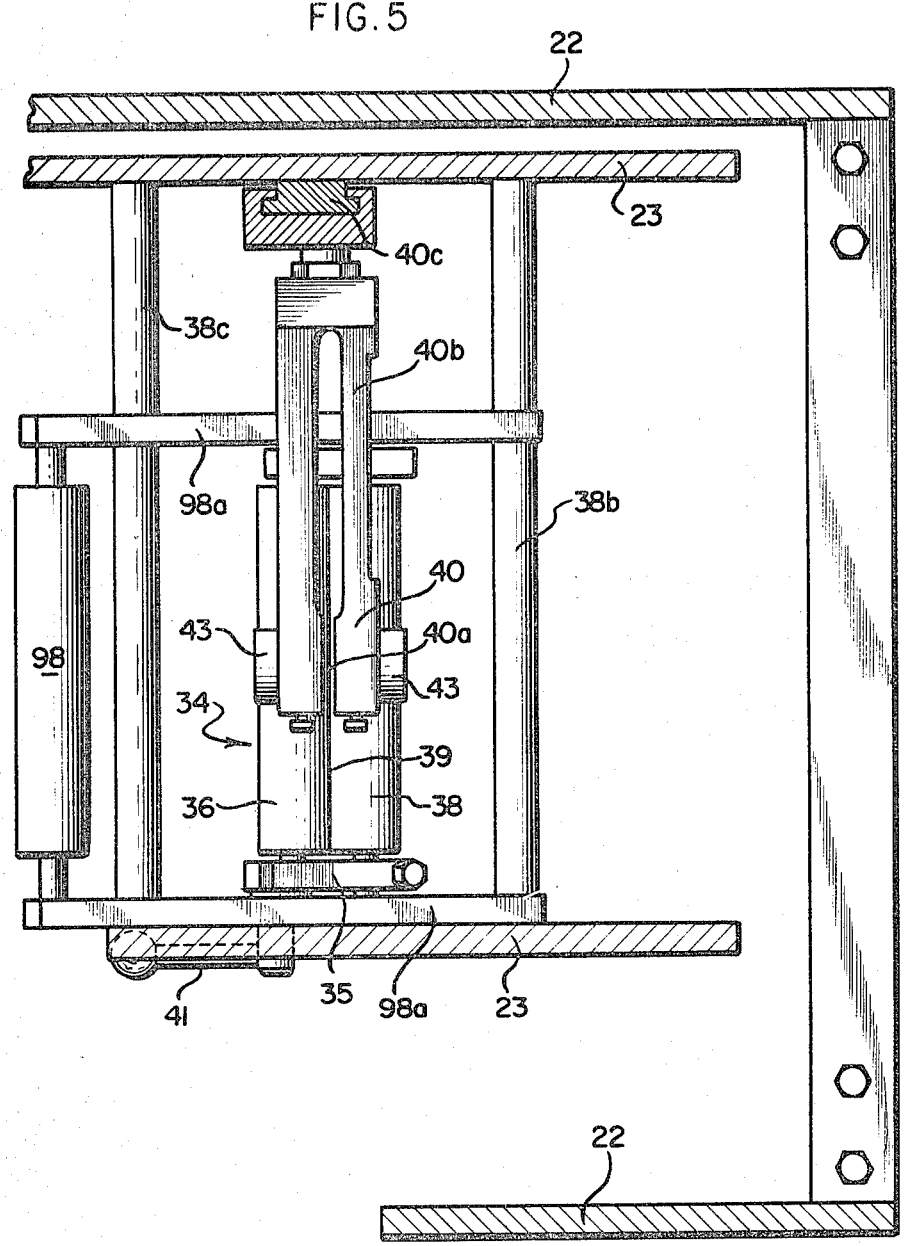
FIG. 5 is a greatly enlarged partial horizontal cross-sectional view taken along line 5—5 of FIG. 1, showing from above the details of the nip grip rollers and sensor means disposed within the interior and exterior frames.

A nip roller means generally 34, as shown in FIGS. 1 and 5, and comprising first and second grip nip rollers 36, 38 is carried by frame 22 and disposed upstream of the label strip straightening means 32 to define a gripping nip 39 through which the strip label stock 29 is threadably disposed. First nip roller 36 is pivotably supported by a nip engagement lever 35, and second nip roller 38 is non-pivotably journaled on and supported by a downwardly extending nip roller housing 38a, as shown in FIG. 6. Housing 38a is in turn supported from interior frame 23 by means of horizontal support bars 38b, 38c. Strip label stock 29 is engaged by grip nip rollers 36, 38 to exert a transverse grip by means of the nip on strip label stock 29 sufficient to bind and firmly hold strip label stock 29 therein, such that strip label stock 29 may pass therethrough only upon turning of grip nip rollers 36, 38.

Sensor means 40 having a label slot 40a therebetween are also carried by frame 22 and are disposed upstream and preferably above grip nip 39 and opposite thereof for detecting the presence and location at a selected time of the transparent label divider portions separating the labels on strip label stock 29. Sensor means 40 may be preferably supported from interior frame 23 and indirectly from frame 22 on sensor arms 40b by means of a mating sensor key mechanism 40c.

Figure 2:
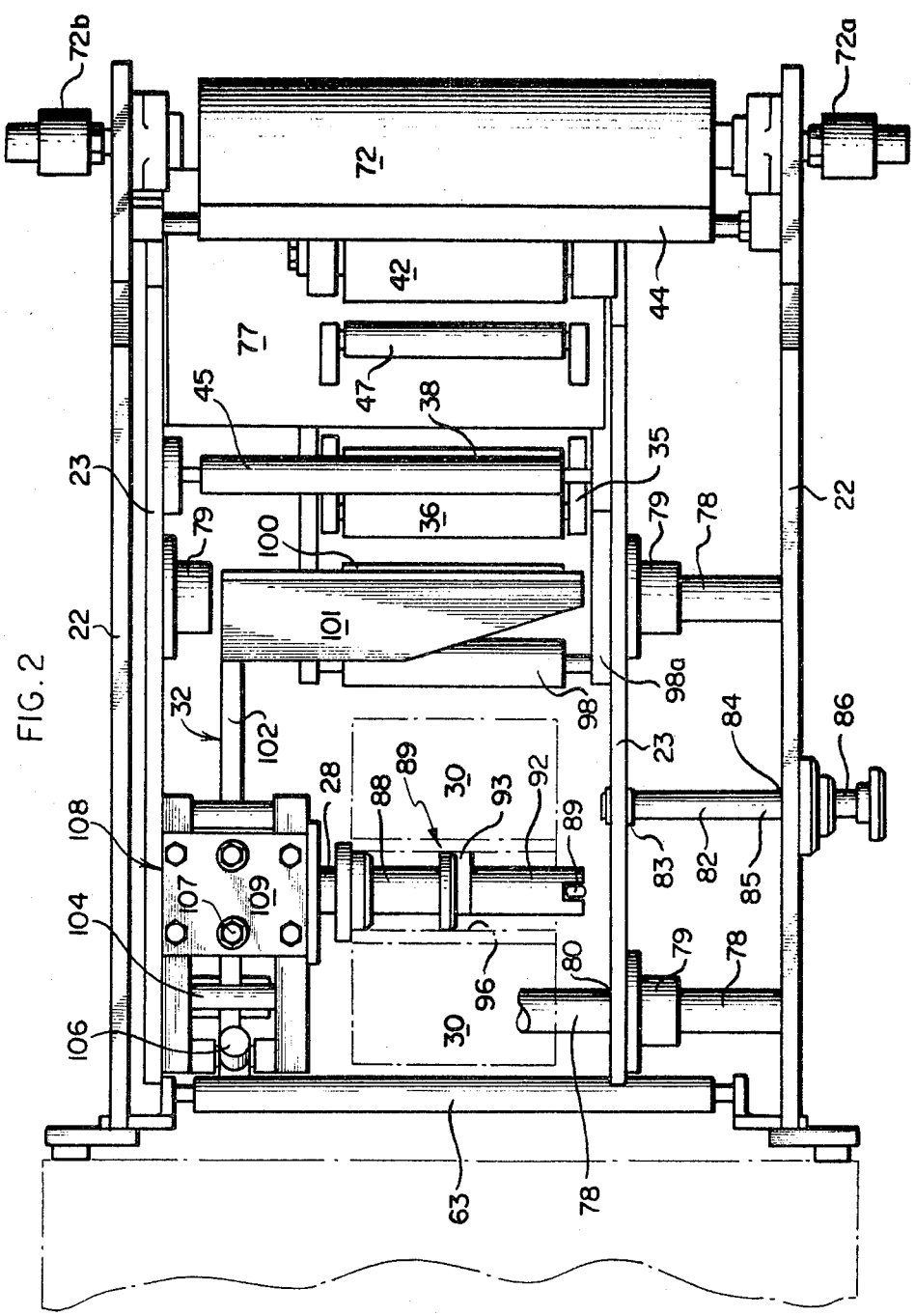
FIG. 2 is an enlarged plan view of the embodiment of the label indexing and applicator apparatus of the present invention as shown in FIG. 1, and further showing details of the exterior and adjustable interior frame mechanism, the holding means disposed on the strip label stock storage shaft, the label strip stock straightening means in the form of a lever operated dancer and the dampening means for the lever thereof, and the engaging mechanism for the heat nip rollers.
Figure 3:
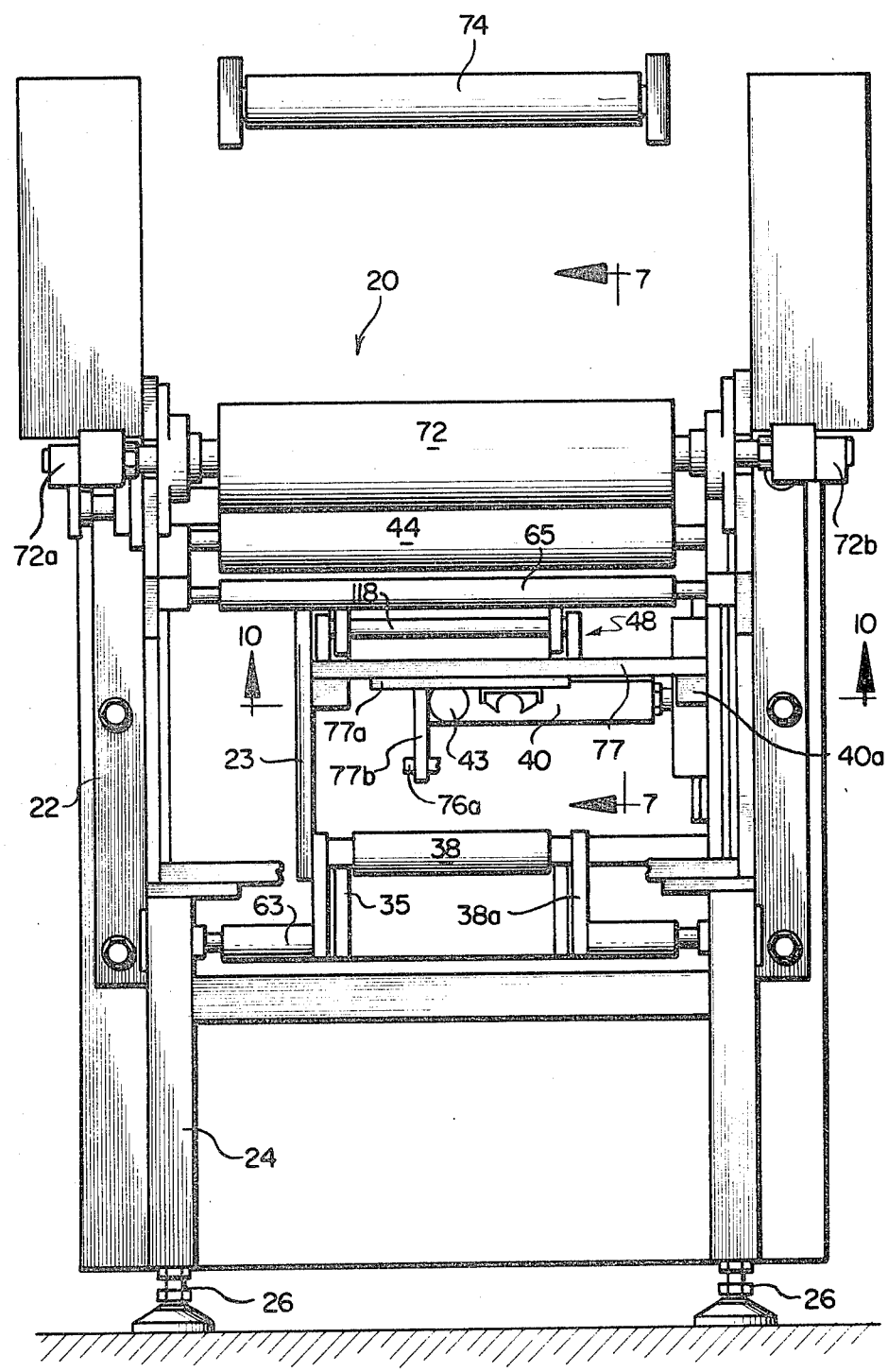
FIG. 3 is an enlarged end view taken from the right or front end of the label indexing and applicator apparatus of the present invention as shown in FIG. 1, and further showing the cooling roller means, the heat nip engagement rollers, and details of the lever operated and actuated heat nip engagement means.
Figure 7:
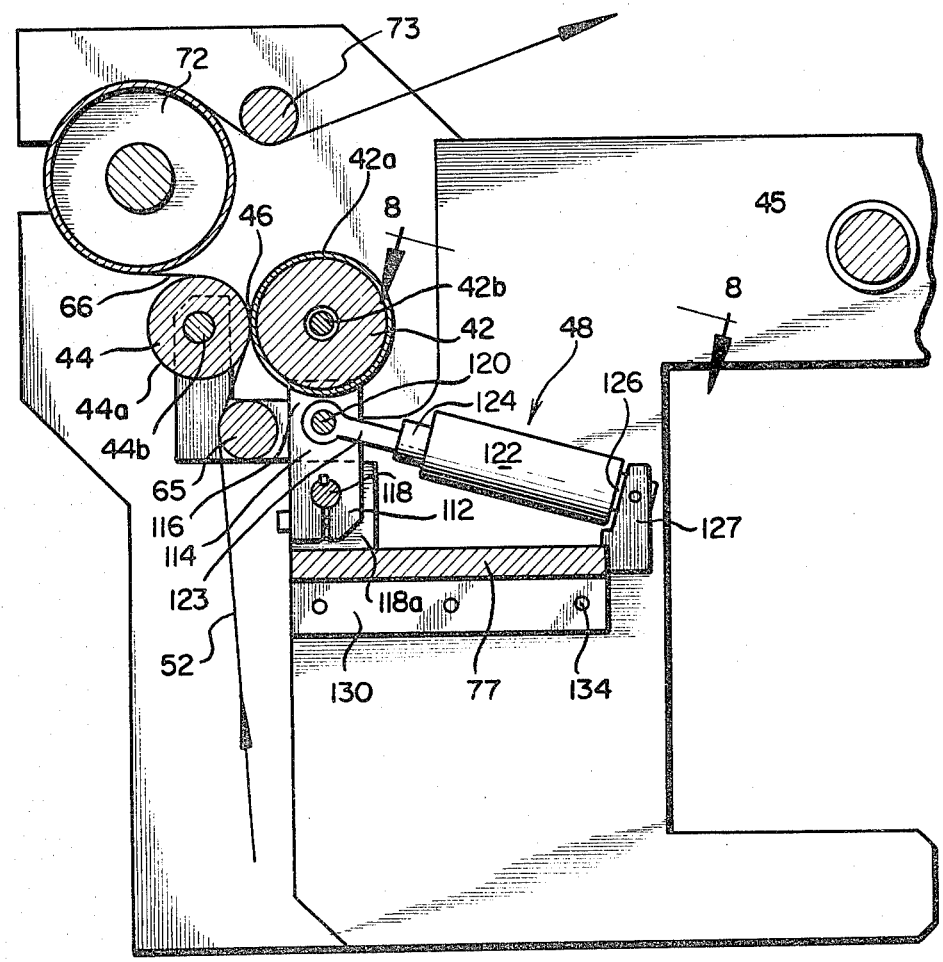
FIG. 7 is a longitudinal cross-sectional view taken along line 7—7 of FIG. 3, showing from the side the details of the piston operated heat nip roller engagement means and the engaging heat nip rollers with the cooling roller located thereabove.

As shown particularly in FIGS. 1, 2 and 7, first and second heat nip rollers 42, 44 are carried by frame 22 and are disposed upstream sensor means 40. At least one of first and second heat nip rollers 42, 44 is heated by means of electrical connections 42d and heating rod 42e to define a heat nip 46 therebetween for threadably engaging strip label stock 29 therethrough. Heat nip engagement means generally 48, as also shown in FIGS. 6 and 9, are carried by frame 22 for engaging heat nip rollers 42, 44 into an operative configuration as shown particularly in FIG. 7.

As shown in FIG. 1, a substrate stock storage shaft 50 is provided for rotationally supporting and paying out the substrate stock 52 from a roll 54 thereof. In connection therewith, substrate stock directional rollers 56, 58, 60, 62, 63, 64, 64 are carried by frame 22 for directing the substrate stock 52 in the first direction as indicated by Arrow A for eventual disposition within and threadable engagement by heat nip 46 and in contact in heat nip 46 with strip label stock 29 as shown in FIG. 7. Accordingly, strip label stock 29 and substrate 52 are bonded together in heat nip 46 to form a laminate 66 as shown in FIGS. 1 and 7. Upstream of heat nip 46 is provided a cooling roller 72 having water coolant influent and effluent parts 72a, 72b, and with accompanying laterally disposed cooling exit guide roller 73, cooling the bonded strip label stock and substrate laminate 66.

Stock pulling means (not shown) is disposed downstream of cooling roller 72 for exerting a pulling force on the bonded strip label stock and substrate laminate 66 over a further laminate directional roller 74 as shown in FIG. 1, and in the general longitudinal direction indicated at Arrow B. The stock pulling means functions to pull strip label stock 29 and substrate 52 in an upstream direction through label applicator apparatus 20 at a selected speed.

As shown is FIGS. 1 and 6, electric motor brake 76 is carried by frame 22 by means of horizontal plate 77, horizontal brake support bracket 77a, and vertical brake support plate 77b for attachment to brake rod support 76a, and is connected to grip nip roller 38 by means of belt 76b for turning the same to permit the gripped strip label stock 29 to pass through nip 39 as shown in FIG. 5 at a controlled variable linear speed. The result is to effect a differential stretch on strip label stock 29 corresponding to the controlled speed of rotation of nip roller 38.

Figure 10:
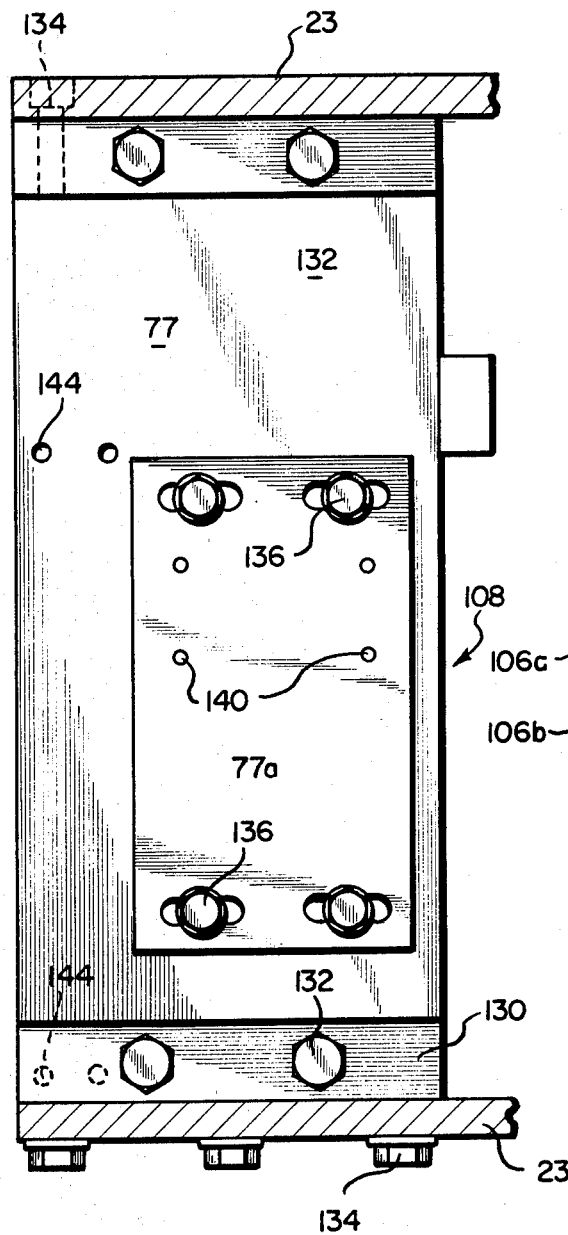
FIG. 10 is a very greatly enlarged horizontal transverse cross-sectional view taken along line 10—10 of FIG. 3, showing the horizontal plate for supporting various elements including the brake means and the heat nip engagement means.
Figure 11:
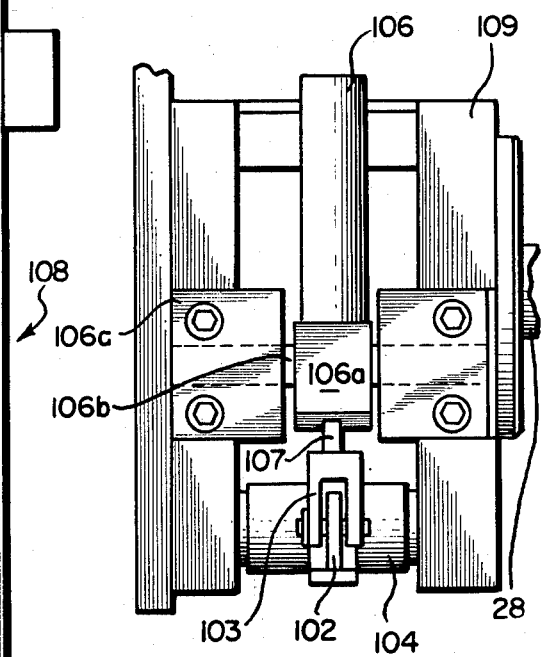
FIG. 11 is an enlarged horizontal transverse cross-sectional view taken along line 11—11 of FIG. 1, showing the piston means engaging the dancer lever means for the pivoting the same to effect tension upon the strip label stock.

As shown in FIG. 10, horizontal plate 77 is supported by means of support blocks 130 and attached thereto by means of vertically disposed bolts 132. Support blocks 130 are in turn attached to interior frame 23 by means of horizontally disposed bolts 134. Hence, horizontal plate 77 is a stable structural component and may serve both to support heat nip engagement means thereabove, and may have brake means 76 disposed therebeneath. As shown also in FIG. 6 horizontal brake support plate 77a is hung from horizontal plate 77 by means of bolts 136. Brake mount 138 is secured to horizontal support plate 77a through apertures 140 by means of bolts 142. Apertures 144 are also provided in horizontal plate 77 for securement of rocker shaft support brackets 118a thereabove.

Control means (not shown) are connected to sensor means and electric motor brake 76 for controlling and varying speed of electric motor brake 76 in accordance with the presence and location at a selected time of the transparent label divided portions or other indicia separating the distinct labels on strip label stock 29 to effect registration of the bonded labels on substrate stock 52.

In preferred embodiments of the indexing and applicator apparatus of the present invention 20, and as shown particularly in FIG. 2, a label applicator apparatus interior frame 23 is adjustably disposed within frame 22 for lateral adjustment with respect to frame 22 and for directly supporting some elements of the apparatus 20 of the present invention. In such preferred embodiments, way bars 78 supported on way bar collars 79 may be provided for connecting to and extending horizontally across interior frame 23, with interior frame 23 containing spaced apertures 80 therein for receiving way bars 78, thereby to be horizontally adjustable by sliding laterally on way bars 78. In such preferred embodiments, the spaced apertures 80 may preferably be lined with a low friction material, such TEFLON. Also in such preferred embodiments, further included may preferably be at least one adjustment rod 82 secured at the distal end 83 thereof to interior frame 23 as shown in FIG. 2. Adjustment rod 82 preferably extends through an aperture 84 in frame 22 for adjustably securing the lateral disposition of interior frame 23 within frame 22. Such adjustment rod 82 may preferably comprise a threaded proximal end 85 which when turned laterally moves adjustment rod 82 and thereby attached interior frame 23 to adjust the disposition of interior frame 23 and elements directly supported thereby within frame 22.

Figure 4:
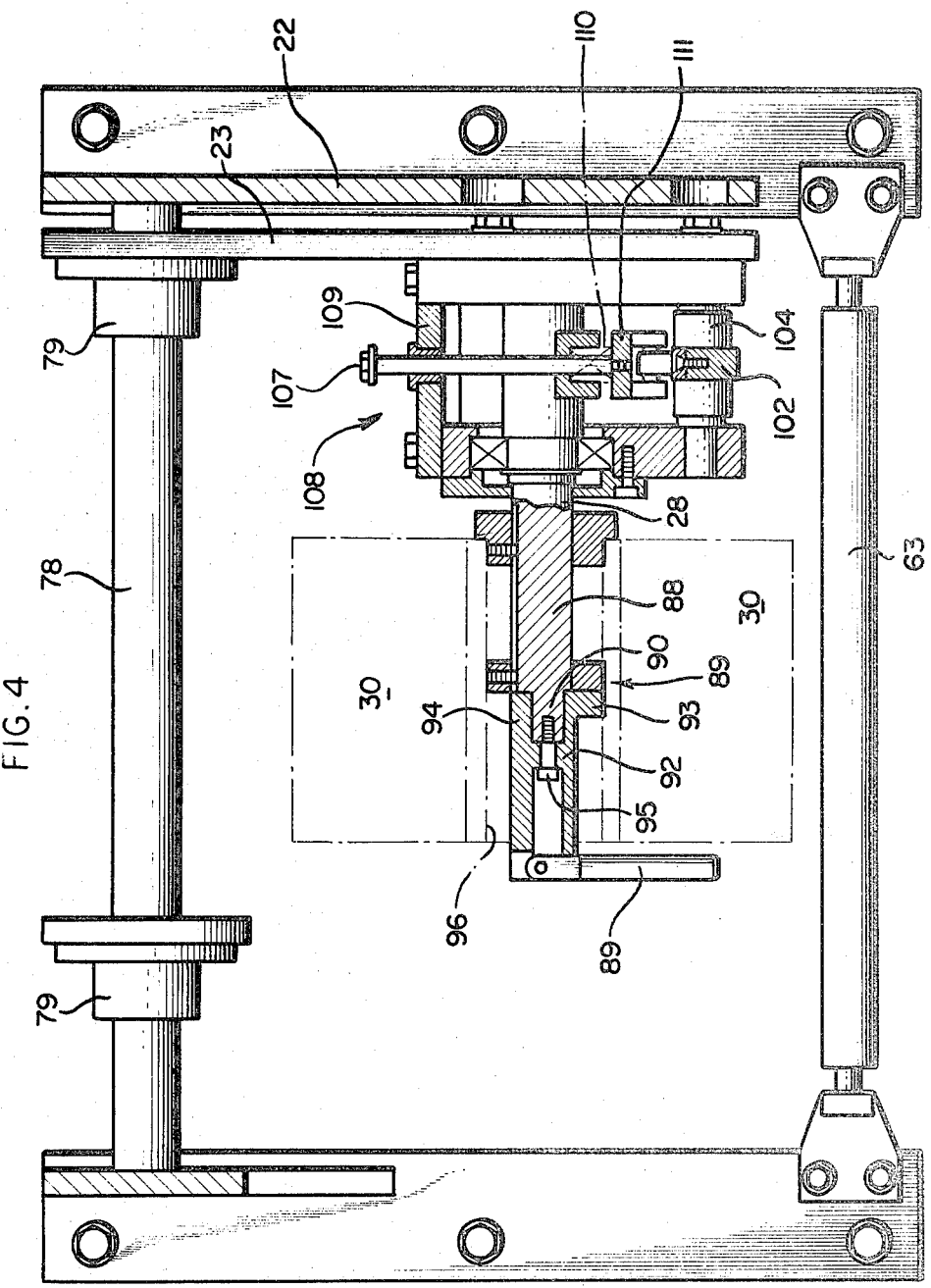
FIG. 4 is a greatly enlarged transverse cross-sectional view taken along line 4—4 of FIG. 1, showing in greater detail the strip label roll securement means disposed on the roll bearing shaft for the same and the dampening means including coil springs for the dancer lever means.

In further preferred embodiments, and as shown in FIGS. 2 and 4, strip label stock shaft 28 may include thereon strip label roll securement means generally 89. The strip label roll securement means 89 preferably comprises a first horizontally disposed roll bearing shaft 88 carried by interior frame 23, which roll bearing shaft 88 has eccentric connection means 90 at the free end thereof. A second horizontally disposed roll bearing shaft 92 is provided and has mating eccentric means 94 at one end thereof for rotational connection by means of an eccentric securement at bolt 95 to eccentric connection means 90 of the first roll bearing shaft 88. First roll bearing shaft 88 has projecting roll engaging means 93 thereon for engagement with interior 96 of roll 30 of the strip label stock 29. Accordingly, second roll bearing shaft 92 may then be rotated by means of a handle 89 on mating eccentrics 90, 94 with respect to first roll bearing shaft 88 to engage the projecting roll engaging means 93 with interior 96 of roll 30 of strip label stock 29.

As shown in FIGS. 1 and 2, the label strip stock straightening means generally 32 of the label indexing and applicator apparatus of the present invention 20 preferably includes a first straightening roller 98 supported by a support plate 98a which is in turn supported by interior frame 23, and having the shaft thereof to render first straightening roller 98 stationary with respct to the interior frame 23. A second roller 100 is disposed in adjustable vertical and pivotable configuration with respect to first straightening roller 98. Thus, strip label stock 29 unwinding from roll 30 of strip label stock 29 is disposed under non-pivotable first straightening roller 98 and over pivotable second straightening roller 100 to be tensioned and straightened by the relative vertical movement of straightening rollers 98, 100. Roller 100 has a confining plate 101 disposed in spaced array thereabove to prevent misalignment of strip label stock 29. In such preferred embodiments, a dancer lever 102 is further included which bears at the distal end thereof second straightening roller 100. A fulcrum means 104 is disposed on dancer lever 102 and a pneumatic cylinder 106 having an extending rod 107 is engagably disposed with respect to the proximal end of dancer lever 104 by means of bracket 103 for pivoting dancer lever 102 about fulcrum means 104 between inoperative and operative positions. Pneumatic cylinder 106 has a lower air conduit port 106a and is supported by means of a horizontal cylinder support rod 106b through brackets 106c disposed on a dampening housing 109. The result is to effect relative separating movement, upon extension of pneumatic cylinder 106, between said first and second rollers 98, 100, to provide thereby controlled tension on strip label stock 29 extending between rollers 98, 100 when in the operative position.

As shown in FIGS. 1, 2, 4 and 10, in such preferred embodiments dampening means generally 108 and contained within dampening housing 109 is further provided for engaging dancer lever 102 between fulcrum means 104 and second straightening roller 100 for dampening the upward movement of dancer lever 102 upon operation of piston means 106 during tensioning of strip label stock 29 when in the operative position. In such preferred embodiments, dampening means 108 comprises a plurality of dampening rods 107 vertically disposed to engage dancer lever 102 and each having at least one coil spring 110 disposed to engage the upper surface of dancer lever 102 by means of a connector bracket 111 when in the operative position.

In preferred embodiments of the label and indexing applicator apparatus of the present invention 20, one of the nip rollers 38 is driven and the other nip roller 36 is free to turn in response to the engagement between nip rollers 36, 38 at nip 39. In such embodiments. one of the nip rollers 36 may be carried by nip engagement lever 35 for pivoting between an engaged position and a disengaged position for ease of threading strip label stock 29 therebetween. As shown in FIGS. 1 and 6, in such embodiments, nip engagement lever 35 is preferably pivotably supported 37 at the proximal end thereof and there is disposed one of the nip rollers 36 at the distal end thereof. In such embodiments, eccentric means 35a operated by eccentric handle 41 may further be included for engaging nip engagement lever 35 between the proximal and distal ends thereof to move nip engagement lever 35 between the engaged and disengaged positions of the rotation thereof.

In preferred embodiments the sensor means 40 may be preferably disposed substantially vertically of nip rollers 36, 38. The sensor means 40 preferably includes photoelectric cells 43, 43.

In addition to the rollers of the label and indexing applicator apparatus of the present invention as described hereinabove, a direction change roller 45 is preferably disposed above sensor means 40 for changing the direction of strip label stock 29 from vertical movement to movement having a forward component upstream in the first direction as shown at Arrow A. In such preferred embodiments, a guide roller 47 is also preferably disposed between direction change roller 45 and heat nip 46. As shown in FIG. 7, heat nip rollers 42, 44 may preferably have TEFLON surface 42a, 44a for freedom from sticking of either of strip label stock 29 or substrate stock 52. Such heat nip rollers 42, 44 are preferably mounted on respective roll shafts 42b, 44b.

Figure 8:
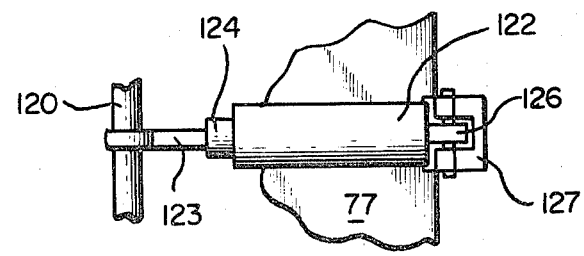
FIG. 8 is a longitudinal view taken along line 8—8 of FIG. 7, showing from above the structure of the pneumatic cylinder and supporting brackets for driving the heat nip engagements means.

Heat nip engagement means generally 48 as shown most particularly in FIG. 9 preferably comprises respective laterally disposed elongated brackets 112 having upwardly extending bracket ears 114 upon which one of the heat nip roller shafts 42b is transversely journaled by means of bearings 42c at upper portions 116 of respective bracket ears 114. In such preferred embodiments a rocker shaft 118 is further included and is supported by rocker shaft support brackets 118a borne by support plate 77, which rocker shaft has bracket ears 114 pivotably disposed thereon for rocking the brackets 112 and thus rocking heat nip roller 42 thereon. Also such preferred embodiments may further include a fixed rod 120 disposed between the upper portion and the lower portion of the respective bracket ears 114, 114. As is also shown in FIG. 8, further included in these embodiments is a fluidic cylinder 122 having its rod end 124 attached to fixed rod 120 and the opposite end 126 of cylinder 122 fixed by a bracket 127 to pivot one of the heat nip rollers 42 into engagement with the other heat nip roller 44. In such preferred embodiments, the fluidic cylinder rod 123 engages fixed rod 120 at a central portion 125 thereof which is substantially equidistant of the respective bracket ears 114, 114.

The basic and novel characteristics of the label indexing and applicator apparatus of the present invention will be readily understood from the foregoing disclosure by those skilled in the art. It will become readily apparent that various changes and modifications may be made in the form, construction and arrangement of the label indexing and applicator apparatus of the present invention as set forth hereinabove without departing from the spirit and scope of the invention. Accordingly, the preferred and alternative embodiments of the present invention set forth hereinabove are not intended to limit such spirit and scope in any way.

What is claimed is:

1. A label indexing and applicator appartus for bonding labels, in controlled index from a rolled strip of flexible and stretchable label stock having the labels longitudinally separated on the strip by detectable label divider indicia to a surface of a substrate stock, said apparatus comprising:
an exteriorly disposed apparatus frame;
strip label stock storage shaft means carried by said exterior frame for rotationally supporting a roll of the flexible and stretchable strip label stock and having a substantially horizontal axis of rotation sufficient for unrolling the labels tangentially of the roll and upstream in a first direction for traveling longitudinally of said frame;
label strip stock straightening means carried by said exterior frame and disposed upstream said strip label stock shaft storage means for applying and maintaining a tension on the strip label stock sufficient to maintain said strip label stock in an essentially unwrinkled state;
a first grip nip roller carried by said exterior frame and disposed upstream said label strip straightening means, said first grip nip roller engaging the strip label stock therearound;
a second grip nip roller carried by said exterior frame and disposed adjacent said first grip nip roller, said second grip nip roller being engageable with said first grip nip roller to define a gripping nip through which the strip label stock is threadably disposed and engaged to exert a transverse grip by means of said gripping nip on the strip label stock sufficient to bind and firmly hold the strip label stock therein, whereby the strip label stock may pass therethrough only upon turning of said grip nip rollers;
sensor means carried by said exterior frame and disposed upstream of said gripping nip and opposite thereof for detecting the presence and location at a selected time of the transparent label divider portions separating the labels on the strip label stock;
a first heat nip roller carried by said exterior frame and disposed upstream of said sensor means;
a second heat nip roller carried by said exterior frame and engageable with said first heat nip roller, at least one of said heat nip rollers being heated to define a heat nip for threadably engaging the strip label stock therethrough;
heat nip engagement means carried by said exterior frame for engaging said heat nip rollers;
substrate stock storage shaft means for rotationally supporting and paying out the substrate stock from a roll thereof;
substrate stock directional roller means carried by said exterior frame for directing the substrate stock for disposition within and for threadable engagement by said heat nip and in contact therein with the strip label stock and the substrate stock are bonded together to form a laminate at and by the heat nip;
cooling means carried by said exterior frame for cooling the bonded strip label stock and substrate laminate;
stock pulling means disposed upstream said cooling means for exerting a pulling force on the bonded strip label stock and substrate laminate, and for thereby separately pulling the strip label stock and subtrate stock in an upstream direction through the label applicator apparatus at a selected speed;
electric motor brake means carried by said exterior frame and connected to one of said nip rollers for turning said nip roller to permit the gripped strip label stock to pass therethrough at a controlled variable linear speed, and thereby to effect a differential stretch thereon corresponding to the speed of rotation of said nip roller; and
control means connected to said sensor means and said electric motor brake means for controlling and varying the speed of said electric motor brake means in accordance with the presence and location at a selected time of the transparent label divider portions separating the labels on the strip label stock to differentially stretch the strip label stock to effect registration of the bonded labels on the substrate stock.

2. The label indexing and applicator apparatus of claim 1 further comprising a label applicator apparatus interior frame adjustably disposed within said exterior frame for lateral adjustment with respect to said exterior frame and for directly supporting at least said strip label stock storage shaft.

3. The label indexing and applicator apparatus of claim 2 further comprising way bars connected to and extending horizontally across said exterior frame, and wherein said interior frame contains spaced apertures therein for receiving said way bars, thereby to be horizontally adjustable by sliding laterally on said way bars.

4. The label indexing and applicator apparatus of claim 3 wherein said spaced apertures are lined with a low friction material.

5. The label indexing and applicator apparatus of claim 4 wherein said low friction material is TEFLON.

6. The label extending and applicator apparatus of claim 2 further comprising adjustment rod means secured at the distal end thereof to said interior frame and extending through an aperture in said exterior frame for adjustably securing the lateral disposition of said interior frame within said exterior frame.

7. The label indexing and applicator apparatus of claim 6 further comprising a threaded proximal end on said adjustment rod means and an engaging adjustment knob, which when turned laterally moves said adjustment rod, and thereby said attached interior frame, to adjust the disposition of said interior frame within said exterior frame.

8. The label indexing and applicator apparatus of claim 2 wherein said strip label stock shaft means includes thereon strip label roll securement means.

9. The label indexing and applicator apparatus of claim 8 wherein said strip label roll securement means comprises a first horizontally disposed roll bearing shaft carried by said interior frame having eccentric connection means at the free end thereof, a second horizontally disposed roll bearing shaft having mating eccentric means at one end thereof for rotational connection to the eccentric connection means of said first roll bearing shaft, said second roll bearing shaft having projecting roll engaging means thereon for engagement with the interior of said roll of strip label stock, whereby said second roll bearing shaft may be rotated on said eccentric means with respect to said first roll bearing shaft to engage said projecting roll engaging means with the interior of said roll of strip label stock.

10. The label indexing and applicator apparatus of claim 1 wherein said label strip stock straightening means includes a first straightening roller having the shaft thereof fixedly secured to render said first straightening roller stationary with respect to said interior frame, and a second stationary roller the disposition of which is adjustable vertically with respect to said first straightening roller, whereby the label strip stock unwinding from the roll of strip stock and disposed under said first straightening roller and over said second straightening roller may be tensioned and straightened by the relative vertical movement of said straightening rollers.

11. The label indexing and applicator apparatus of claim 10 further comprising dancer lever means bearing at the distal end thereof said second straightening roller, fulcrum means disposed on said dancer lever means, and piston means engaged with the proximal end of said dancer lever means for pivoting said dancer lever means about said fulcrum means between inoperative and operative positions to effect relative separating movement upon extension of said piston means between first and second rollers to provide thereby tension on the strip label stock extending between said rollers when in said operative position.

12. The label indexing and applicator apparatus of claim 11 further comprising dampening means engaging said dancer lever means between said fulcrum means and said second straightening roller for dampening the upward movement of said dancer lever means upon operation of said piston means during tensioning of said strip label stock when in said operative position.

13. The label indexing and applicator apparatus of claim 12 wherein said dampening means comprises at least one coil spring disposed to engage the upper surface of said dancer lever means when in said operative position.

14. The label indexing and applicator apparatus of claim 1 wherein one of said nip rollers is driven and the other of said nip rollers is free to turn in response to said engagement between said nip rollers.

15. The label and indexing applicator apparatus of claim 14 wherein at least one of said first and second nip rollers is carried by a nip engagement lever for pivoting between an engaged position and a disengaged position of said nip rollers.

16. The label indexing and applicator apparatus of claim 15 wherein said nip engagement lever is pivotably supported at the proximal end thereof and bears one of said nip rollers at the distal end thereof.

17. The label indexing and applicator apparatus of claim 16 further comprising eccentric means for engaging said nip engagement lever between said proximal and distal ends thereof to move said nip engagement lever between the engaged and disengaged positions by the rotation thereof.

18. The label indexing and applicator apparatus of claim 1 wherein said sensor means is disposed substantially vertically of said nip rollers.

19. The label indexing and applicator apparatus of claim 1 wherein said sensor means comprises a photoelectric cell.

20. The label indexing and applicator apparatus of claim 1 further comprising a direction change roller disposed above said sensor means for changing the direction of the strip label stock from vertical movement to movement having a forward component upstream in the first direction.

21. The label indexing and applicator apparatus of claim 20 further comprising a guide roller disposed between said direction change roller and said heat nip.

22. The label indexing and applicator apparatus of claim 1 wherein at least one of said heat nip rollers has a TEFLON surface.

23. The label indexing and applicator apparatus of claim 1 wherein said heat nip rollers are mounted on respective roller shafts and said heat nip engagement means comprises respective laterally disposed elongated brackets having upwardly extending bracket ears upon which one of said heat nip roller shafts is transversely journaled at upper portions of the respective said bracket ears.

24. The label indexing and applicator apparatus of claim 23 further comprising rocker shaft means which has journaled thereon said bracket ears at a lower portion thereof, whereby said brackets and accordingly said heat nip roller may rock thereon.

25. The label indexing and applicator apparatus of claim 24 further comprising a fixed rod disposed between the upper portion and the lower portion of said respective bracket ears and connecting said respective bracket ears, and further comprising a fluidic cylinder having the rod end thereof attached to said fixed rod and the opposite end of said cylinder fixed to pivot one of said heat nip rollers into engagement with the other of said heat nip rollers.

26. The label indexing and applicator apparatus of claim 25 wherein said fluidic cylinder rod engages said fixed rod at a central portion thereof substantially equidistant of said respective bracket ears.

27. The label indexing and applicator apparatus of claim 1 wherein said substrate stock storage shaft means and the supported roll of substrate stock are disposed adjacent said strip label stock and on the side thereof opposite said gripping nip, whereby the substrate stock may be paid out upstream and in said first direction.

28. The label indexing and applicator apparatus of claim 1 further comprising guide rollers for the substrate stock including at least one direction change guide roller disposed generally below said heat nip to change the direction of travel of substrate stock from said first direction to a vertical direction for directing the substrate stock into said heat nip for laminate bonding with the strip label stock.

29. The label indexing and applicator apparatus of claim 1 wherein said cooling means comprises a cooling roller disposed adjacent said heat nip for cooling the bonded strip label and substrate stock laminate.

30. The label indexing and applicator apparatus of claim 1 further comprising at least one direction change roller disposed adjacent said cooling means for changing the direction of said bonded strip label and substrate stock laminate to a second direction substantially opposite to the first direction for feeding into a packaging machine.

31. The label indexing and applicator apparatus of claim 1 wherein said stock pulling means pulls each of the strip label stock and substrate stock from their respective rolls through said label applicator apparatus.

32. The label indexing and applicator apparatus of claim 1 wherein said stock pulling means pulls the respective strip label and substrate stocks through said label applicator apparatus at a speed which coincides with the speed of an associated packaging machine.

33. In a label indexing and applicator apparatus having laminating means, said apparatus for bonding labels in controlled index from a rolled strip of flexible and stretchable label stock to a surface of a substrate to form a laminate, said apparatus having at a downstream end means for pulling the labels and substrate bonded thereto through the apparatus at a selected linear speed, said strip label stock comprising longitudinally distinct labels with the labels bonded in longitudinally distinct array to form the laminate, said apparatus having at an upstream end means for storing and unrolling the strip label stock in an essentially unwrinkled state and at a tension at the upstream end less than the tension sufficient to impart any substantial longitudinal stretch thereto, the improvement comprising:

a pair of nip rollers separating the upstream and downstream ends drivingly engaging the strip label stock there-between and exerting a selected binding force laterally thereon, said binding force greater than the force sufficient to longitudinally stretch the strip label stock;

electric motor brake means connected to and driving one of said nip rollers at a controlled and variable rotational speed to grippingly drive the strip label stock therethrough at a controlled linear speed which when lesser than the pulling linear speed effects tension sufficient to impart a longitudinal stretch of controlled magnitude on the strip label stock;

prebonding sensor means disposed on the downstream side of said nip rollers for generating a prebonding detection signal in response to a selected portion of each successive distinct label on the strip label stock;

postbonding sensor means disposed downstream of the laminating means for generating a postbonding detection signal in response to a selected portion of each of the laminated distinct labels;

control means connected to said sensor means and said electric motor brake means for receiving the prebonding and postbonding detection signal and controlling and varying the drive speed of said electric motor brake means and thereby the rotational speed of said binding nip rollers to vary the magnitude of the differential stretch imparted to the strip label stock to present the selected portion of each successive prebonded distinct label for detection at a selected time.

* * * * *